United States Patent

[11] 3,575,202

| | | |
|---|---|---|
| [72] | Inventor | Joseph J. Turek<br>Riverside, Ill. |
| [21] | Appl. No. | 850,192 |
| [22] | Filed | Aug. 14, 1969 |
| [45] | Patented | Apr. 20, 1971 |
| [73] | Assignee | W. D. Allen Manufacturing Co.<br>Broadview, Ill. |

[54] HOSE RACK SAFETY VALVE DEVICE
5 Claims, 8 Drawing Figs.

[52] U.S. Cl. ..................................................... 137/355.18
[51] Int. Cl. ........................................................ A62c 35/20
[50] Field of Search ............................................ 137/355.18;
251/68; 137/797

[56] References Cited
UNITED STATES PATENTS

| | | | |
|---|---|---|---|
| 2,719,752 | 10/1955 | Dodge et al. .................. | 137/355.18 |
| 2,993,503 | 7/1961 | Pokryfke et al. .............. | 137/355.18 |
| 3,422,839 | 1/1969 | Svenson ....................... | 137/355.18 |

*Primary Examiner*—M. Cary Nelson
*Assistant Examiner*—Michael O. Sturm
*Attorney*—Kinzer, Dorn and Zickert ABSTRACT: A safety valve device for use with fire hose mounted on a rack to control the water supply to the hose, wherein following removal of the hose from the rack and jerking of the last part of the hose therefrom pulls a chain connected to the safety valve for opening same to connect the water supply to the hose.

INVENTOR
JOSEPH J. TUREK

INVENTOR
JOSEPH J. TUREK

BY
Kinzer, Dorn & Zickert
ATTORNEYS

INVENTOR
JOSEPH J. TUREK

BY

ATTORNEYS

HOSE RACK SAFETY VALVE DEVICE

This invention relates in general to fire safety equipment and more particularly to fire hose storage devices, and still more particularly to fire hose storage devices including a safety valve that is actuated as the last portions of the hose are removed from the rack.

The present invention relates to a safety valve for use on pin type hose storage racks of the type disclosed in U.S. Pat. No. 2,753,142, which is assigned to the assignee of the present application. For such a hose rack, it has been common to employ a type of hose clamp that prevents the water from being released to the hose removed from the rack until nearly all hose has been removed, the clamp operating upon removal of the last remaining part of the hose. Another type of hose clamp is shown in U.S. Pat. No. 2,993,503, assigned to the assignee of the present application, which clamp tightly clamps the hose at a point adjacent to the water supply valve.

Heretofore, it has been common to use linen hose of a type that is a flax woven hose without the use of a rubber tube liner for pin type racks, as such a hose can be folded and installed on such a rack for an indefinite time without fear of damage, and can be clamped as shown in the aforementioned U.S. Pat. No. 2,993,503. Linen hose is the only type that is accepted by Underwriter's Laboratories (UL) when used with a clamp device. In recent years, a more inexpensive lightweight hose having a rubber lining has been used on pin type racks However, presently known clamps have not been approved by UL for use with this type of hose. In fact, clamping of a rubber lined hose for long periods of time causes the rubber to vulcanize at the pinched or clamped point which leads to cracking and possible hose failure. Moreover, the regular clamping devices available will not accommodate rubber-lined or dry-rack hose because of the varying thickness of different manufacturers.

The present invention obviates the difficulties above set forth and provides a device for preventing the water supply from passing into the hose until all of the hose has been removed from the rack, while not clamping the hose in any manner. Therefore, the device is acceptable for use with rubber-lined hose, but can also be used with linen hose. Moreover, the present invention is not restricted to any particular hose thickness.

The present invention includes a safety valve that is mounted between a supply valve and the inlet end of the hose, and which is operable by swinging a lever to open the valve. The lever is connected to a length of chain that is trained about the first folded loop of hose supported on the rack directly adjacent the safety valve, so that after removal of all but the first loop of hose and thereafter yanking or jerking of the hose, substantially simultaneously the first loop will be removed from the hose rack upon breaking of the chain and the safety valve will be opened to permit the flow of water into the hose.

It is therefore an object of the present invention to provide a new and improved safety device for use with fire hose stored on racks to permit removal of the hose from the rack before connection of the hose to the water supply.

Another object of the present invention is in the provision of a safety device for controlling the connection of the water supply to a fire hose stored on a hose rack that does not involve clamping of the hose and which may be used on fire hose of any thickness.

Other objects, features and advantages of the invention will be apparent from the following detained disclosure, taken in conjunction with the accompanying sheets of drawings, wherein like reference numerals refer to like parts, in which.

Figure 6:
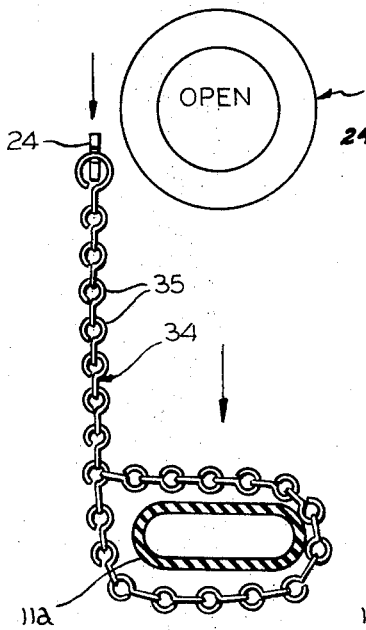
FIG. 6 is a view similar to FIG. 5, but illustrating the first step in the operation of the safety valve device following the yanking of the hose to open the safety valve and connect the water supply to the hose.
Figure 7:
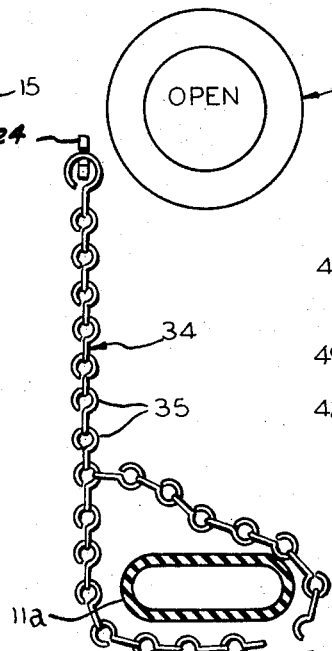
Figure 8:
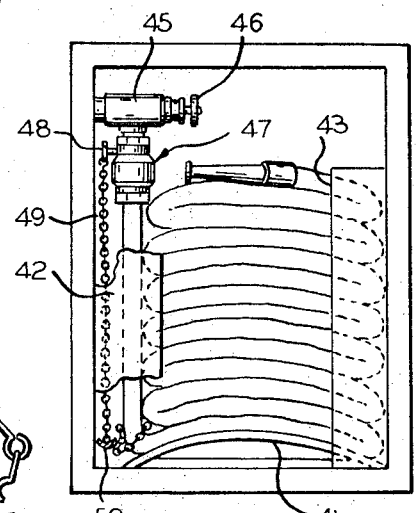

FIG. 7 is a view similar to FIG. 6 and illustrating the next step in the operation of the safety device of the invention wherein the frangible member is broken or separated to permit complete removal of the hose from the rack; and FIG. 8 is a somewhat diagrammatic front elevational view of a fire protection hose cabinet where the hose is stored in stacked relation and wherein the safety valve device of the invention is applicable.

Figure 1:
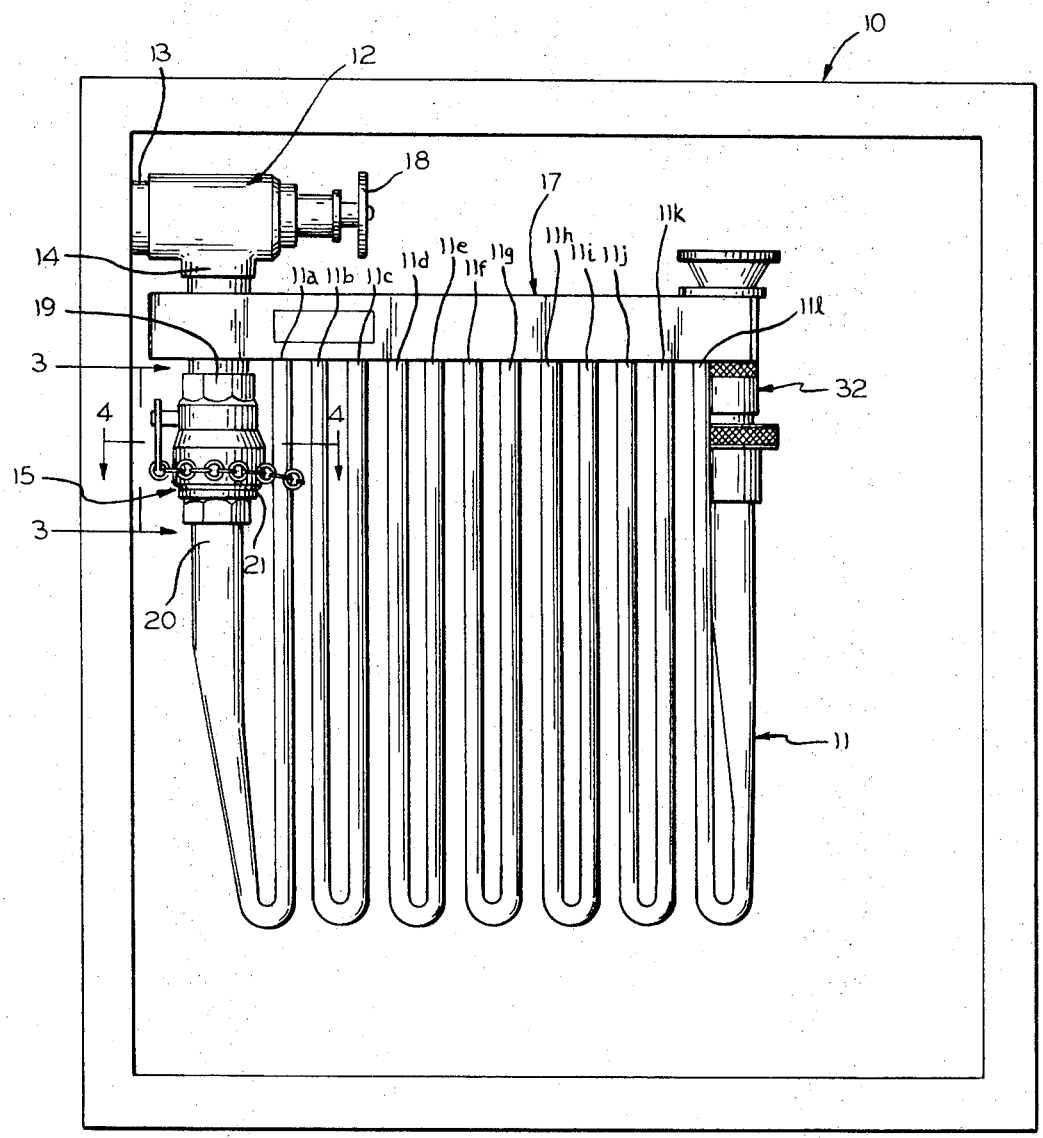
FIG. 1 is a front elevational view of a hose rack in a cabinet equipped with the safety valve device of the present invention.
Figure 2:
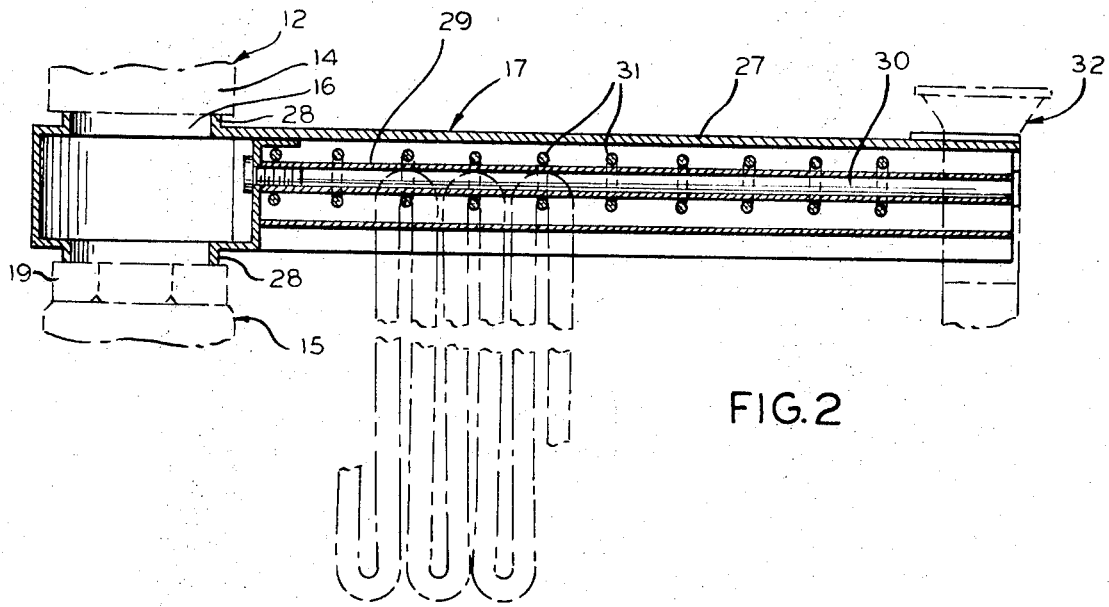
FIG. 2 is an enlarged fragmentary view of the rack for illustrating the manner of hanging the hose.

Referring to the drawings and particularly to FIGS. 1 and 2, a fire protection hose cabinet 10 adapted to be mounted on or recessed in a wall for the storage of a fire protection hose 11 serves to illustrate one use of the present invention. A water supply angle valve 12 is suitably connected to a source of water under pressure at its inlet 13, while its outlet 14 is suitably connected to a safety valve 15. As seen particularly in FIG. 2, a fitting 16 interconnects the water supply valve 20 and the safety valve 15, while also serving to define with shoulders on the valves, a support for a hose rack 17. A wheel or knob 18 on the water supply valve 12 serves to open and close the valve. In normal storage conditions, this valve will be closed, and thereafter opened when there is a need to use the fire protection hose and first prior to removal of the hose from the cabinet. It should be appreciated that the cabinet 10 may or may not have a door mounted thereon for closing off access to the cabinet. Further, the hose rack 17 may, together with the valves 12 and 15, be mounted directly on the wall or some other support member.

Figure 3:
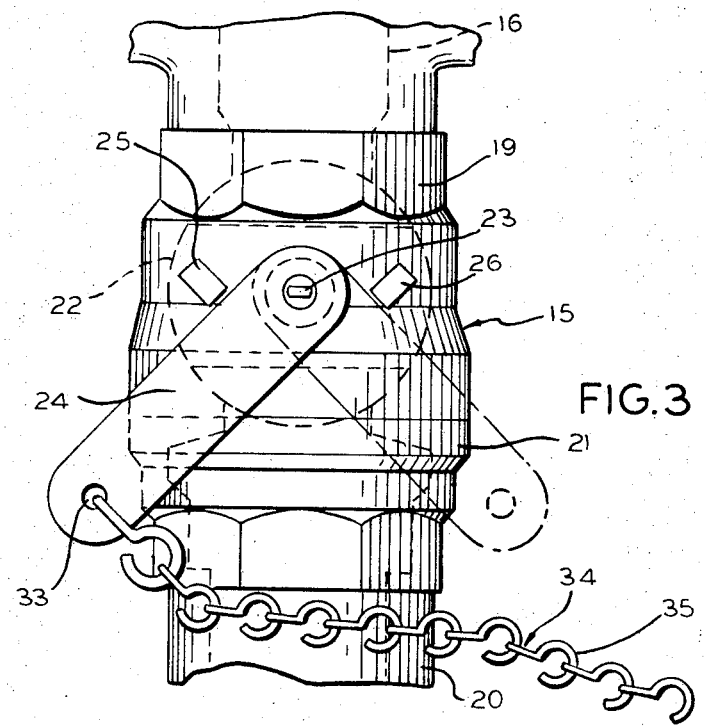
FIG. 3 is an enlarged side elevational view of the safety valve, looking along line 3—3 of FIG. 1.

The inlet end 19 of the safety valve 15 is in communication with the outlet 14 of the water supply valve 12 through the fitting 16. The inlet end 20 of the hose 11 is connected to the outlet end 21 of the safety valve 15. While the valve 15 may be of any suitable type, it is illustrated as being of the well known wall type, wherein a ball 22 is rotatable within the valve to selectively open and close the valve. A shaft 23 extends from the valve and is internally connected to the ball, whereby a lever 24 is secured to the shaft 23 for applying a rotational force to the ball through the shaft to open and close the valve. As seen in FIG. 3, the position of the lever in solid lines illustrates the valve in closed position while the dotted line position illustrates it in open position. In order to facilitate operation of the valve, stops 25 and 26 integral with the valve body limit the extreme positions of the lever 24, and the ball.

The hose rack 17 includes an elongated body 27 having upper and lower openings on one end with formed integral collars 28 which coact with the fitting 16 and the shoulders on the valves 12 and 15, and rotatably or swingably mount the rack body relative the valves. The rack body is preferably made of sheet metal and is channel shaped in cross section in the same fashion as that illustrated in aforementioned U.S. Pat. No. 2,753,142. A tubular rod 29 is supported within the rack body and extends longitudinally to telescopically support a rod 30. A plurality of hose carrying pins 31 are supported on the tubular rod 29 and a longitudinally extending flange (not shown). The outer end of the rack body is formed to removably support a hose nozzle 32 which is connected to the outlet end of the hose 11. As seen in FIGS. 1 and 2, the hose is hung in loops 11a to 11l. As the hose is being removed from the rack the rack is first preferably swung upwardly away from the cabinet or wall, and the hose nozzle is first removed before withdrawing any of the hose loops. Thereafter, the hose is withdrawn from the hose rack by pulling one loop out after the other with its accompanying supporting pin until only the first formed loop 11a remains in the hose rack. Removal of loop 11a operates the safety valve device of the invention.

Figure 4:
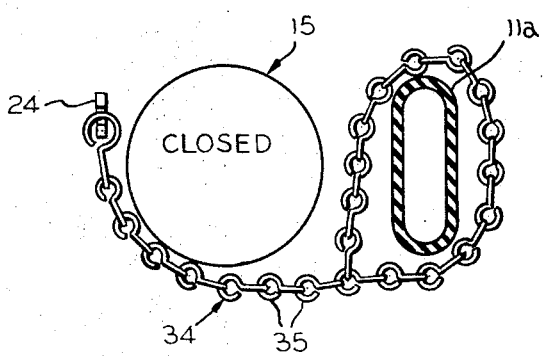
FIG. 4 is a somewhat diagrammatic view, taken along line 4—4 of FIG. 1 to illustrate the frangible member in position during the normal storage of the hose on the hose rack.
Figure 5:
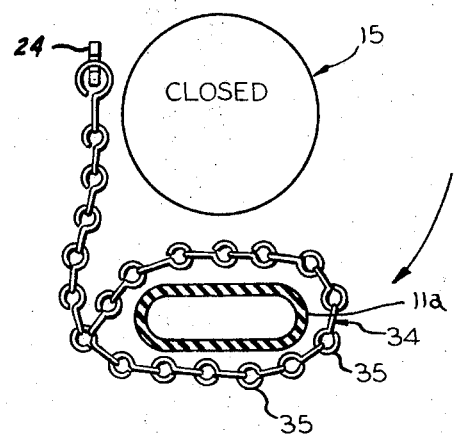
FIG. 5 is a view similar to FIG. 4, but illustrating the position of the first hose loop and frangible member when the rack has been swung out from the cabinet.

Prior to removal of the hose from the cabinet and rack, the water supply valve 12 is opened to allow water to run to the safety valve 15. The safety valve lever 24 is provided with a hole 33 at its outer free end to which is attached one end of a frangible chain 34. The chain 34 is in the form of a plurality of interconnecting chain links 35, and serves to allow opening of the safety valve 15 upon pulling of the first formed loop 11a from the hose rack 17. As seen in FIG. 4, the frangible chain 34 which extends from the free end of the safety valve lever 24 is trained about the first formed hose loop 11a and connected so that the first formed loop 11a is effectively connected to the safety valve lever 24. The position of the frangible chain shown in FIG. 4 is that of the hose storage position such as shown in FIG. 1, and the hose rack is normally pulled to swing out so that the first formed hose loop and chain will take the position similar to that as shown in FIG. 5 when the hose is being removed from the rack. The valve 15 is still in closed position.

Upon removal of all hose loops except 11a, the operator may then jerk the hose to cause the last hung loop to apply force through the frangible chain 32 to swing the lever 24 to open position and open the valve 15. Substantially simultaneously with this last jerking motion of the hose, the frangible chain 34 will break or separate, such as illustrated in FIG. 7 to permit the remaining hung hose loop to be removed from the hose rack and withdrawn from the cabinet.

It will be appreciated that the frangible chain 34 may take some other form such as a rope or cable with a weakened portion, and that looping of the chain about the first formed hose loop is loosely accomplished so as to not cause any undue pressure on the hose during storage. It should also be appreciated that the safety valve device may thereafter be reset by repairing the frangible chain to again function for opening safety valve 15.

The safety valve device of the invention may likewise be employed in a fire protection cabinet where the hose is stacked instead of hung, and FIG. 8 illustrates such a suitable arrangement. The cabinet 40 includes a support 41 at the lower wall and upwardly extending hose retaining flanges 42 and 43 at the sidewalls, whereupon the hose 44 may be stacked upon the support 41 and retained in place by the flanges 42 and 43. A supply valve 45 is mounted in the cabinet along one sidewall and provided with a knob 46 for opening and closing same. This supply valve would be in the same form as the supply valve 12 shown in the cabinet in FIG. 1. Attached to this supply valve is the safety valve 47 having the control lever 48 arranged at one side wherein the valve is closed when the line is in the up position and open when the lever is in the down position. The frangible chain 49 is connected at one end to the free end of the lever 48, then trained downwardly through a guide member 50 and finally around the hose 44. The operation is similar to that of the embodiment of FIG. 1 wherein following removal of the hose layers from the support 41, the hose may then be jerked to cause the chain to move downwardly and open the safety valve 47, and thereafter to break the chain and allow the hose to extend freely from the cabinet.

It will be understood that modifications and variations may be effected without departing from the scope of the novel concepts of the present invention.

I claim:

1. In combination with a hose storage apparatus for storing fire hose connected at one end to a water supply valve, a device for automatically opening the water supply to the hose when the hose has been substantially removed from the apparatus, said device comprising a safety valve mounted between the supply valve and one end of the hose, a lever on said valve movable between open and closed positions, and a flexible frangible member secured to the lever and a part of the hose adjacent the safety valve whereby yanking of the last portion of the hose from the apparatus first pulls the lever to the open position and then separates the flexible frangible member to free the hose and allow it to be completely removed from the apparatus.

2. The combination as defined in claim 1, wherein the flexible frangible member is link chain.

3. The combination as defined in claim 1, wherein the hose storage apparatus is a rack which the hose is hung in loops.

4. The combination as defined in claim 1, wherein the hose storage apparatus is a support upon which the hose is stacked in loops.

5. The combination as defined in claim 3, wherein the frangible member is loosely encircling the first loop hung adjacent the safety valve.